(12) United States Patent
Huang (10) Patent No.: US 11,526,058 B2
(45) Date of Patent: Dec. 13, 2022

(54) DISPLAY PANEL AND DISPLAY APPARATUS

(71) Applicant: HKC CORPORATION LIMITED, Shenzhen (CN)

(72) Inventor: Bei Zhou Huang, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 901 days.

(21) Appl. No.: 16/320,089

(22) PCT Filed: Nov. 1, 2018

(86) PCT No.: PCT/CN2018/113368
§ 371 (c)(1),
(2) Date: Jan. 23, 2019

(87) PCT Pub. No.: WO2020/062425
PCT Pub. Date: Apr. 2, 2020

(65) Prior Publication Data
US 2021/0333669 A1 Oct. 28, 2021

(30) Foreign Application Priority Data
Sep. 30, 2018 (CN) .......................... 201811158755.9

(51) Int. Cl.
| | | |
|---|---|---|
| *G02F 1/13* | (2006.01) | |
| *G02F 1/1362* | (2006.01) | |
| *G02F 1/1343* | (2006.01) | |
| *G02F 1/1368* | (2006.01) | |

(52) U.S. Cl.
CPC ...... *G02F 1/136286* (2013.01); *G02F 1/1368* (2013.01); *G02F 1/134309* (2013.01); *G02F 1/136263* (2021.01)

(58) Field of Classification Search
CPC ......... G02F 1/136286; G02F 1/134309; G02F 1/136263; G02F 1/1368; G02F 1/13629; G02F 1/136259; G02F 1/136268
See application file for complete search history.

(56) References Cited

U.S. PATENT DOCUMENTS

2002/0163614 A1\* 11/2002 Hinata .................. G02F 1/1345
349/139
2006/0061719 A1\* 3/2006 Tomioka ........... G02F 1/134363
349/123
2007/0236625 A1 10/2007 Wang et al.
(Continued)

FOREIGN PATENT DOCUMENTS

| CN | 101713892 A | 5/2010 |
|---|---|---|
| CN | 102074503 A | 5/2011 |

(Continued)

OTHER PUBLICATIONS

Xijie Chen, the ISA written comments, Jul. 2019, CN.

*Primary Examiner* — S M Sohel Imtiaz (57) ABSTRACT

This application discloses a display panel and a display apparatus. The display panel includes a common electrode cable, an active switch, and a signal cable. The signal cable is overlapped with the active switch to form a first overlapping region, and a first extension cable and a second extension cable of the common electrode cable are connected to the signal cable to form a second overlapping region and a third overlapping region.

5 Claims, 7 Drawing Sheets

(56) References Cited

U.S. PATENT DOCUMENTS

| | | | | |
|---|---|---|---|---|
| 2007/0285595 A1* | 12/2007 | Hirao | ............... | G02F 1/136259 |
| | | | | 349/56 |
| 2011/0031499 A1* | 2/2011 | Kimura | ............... | H01L 27/1255 |
| | | | | 257/59 |
| 2012/0052606 A1* | 3/2012 | Yamazaki | ........... | H01L 27/1288 |
| | | | | 438/23 |
| 2014/0139490 A1* | 5/2014 | Hwang | ................... | G06F 3/042 |
| | | | | 345/175 |
| 2015/0325595 A1* | 11/2015 | Yamazaki | ............. | H01L 27/127 |
| | | | | 438/104 |
| 2017/0115522 A1* | 4/2017 | Mun | ................... | G02F 1/13439 |
| 2018/0157134 A1* | 6/2018 | Lee | ....................... | H01L 27/124 |
| 2019/0250451 A1* | 8/2019 | Xu | ....................... | H01L 27/1255 |

FOREIGN PATENT DOCUMENTS

| | | | |
|---|---|---|---|
| CN | 103135237 A | | 6/2013 |
| CN | 103135297 A | * | 6/2013 |
| CN | 104916650 A | | 9/2015 |
| CN | 107578700 A | | 1/2018 |

\* cited by examiner

DISPLAY PANEL AND DISPLAY APPARATUS

This application claims priority to Chinese Patent Application No. CN201811158755.9, filed with the Chinese Patent Office on Sep. 30, 2018 and entitled "DISPLAY PANEL AND DISPLAY APPARATUS", which is incorporated herein by reference in its entirety.

TECHNICAL FIELD

This application relates to the field of display technologies, and more specifically, to a display panel and a display apparatus.

BACKGROUND

Descriptions herein provide only background information related to this application, and do not necessarily from the prior art.

Liquid crystal displays are widely applied because of many advantages such as thin bodies, electricity saving, and no radiation. Liquid crystal displays on the market are mostly backlight liquid crystal displays, and include liquid crystal panels and backlight modules. A working principle of the liquid crystal panel is as follows: liquid crystal molecules are arranged on two parallel glass substrates, and a drive voltage is applied to the two glass substrates to control a rotation direction of the liquid crystal molecules, to refract light of the backlight module to generate a picture.

In a panel production process, because of environment or machine device factors, some metal cables usually have defects or some metals are short-circuited, resulting in that a sub-pixel is displayed abnormally. For example, a scanning line and a signal cable are abnormally short-circuited, resulting in a reduced product yield and cost waste. A improvement method known by the applicant is a laser cutting manner. An endpoint of an active switch of the sub-pixel displayed abnormally is cut, to separate the endpoint from a short circuit, and make the sub-pixel form a dark dot. When a quantity of dark dots is sufficiently small, a product yield can be improved. A pixel electrode usually combines the active switch and the signal cable. If the active switch is abnormally mended after being produced, the abnormal active switch is usually disconnected, but a signal of the signal cable cannot be normally transferred.

SUMMARY

This application aims to provide a display panel and a display apparatus, to resolve a problem that after an active switch is disconnected, a signal of a signal cable cannot be normally transferred.

To achieve the foregoing objective, this application provides a display panel. The display panel comprises a substrate.

The substrate comprises a first gate electrode layer, a second gate electrode layer, a third gate electrode layer, a common electrode cable, an active switch, and a signal cable. The first gate electrode layer, the second gate electrode layer, and the third gate electrode layer are sequentially arranged from top to bottom. The common electrode cable is connected to the first gate electrode layer and the third gate electrode layer and passes through the second gate electrode layer. The second gate electrode layer is connected to the active switch. The common electrode cable comprises a main cable, a first extension cable, and a second extension cable. The signal cable is overlapped with the active switch, and an overlapped portion is a first overlapping region. The first extension cable and the second extension cable are connected to the signal cable at two ends of the first overlapping region, to form a second overlapping region and a third overlapping region.

Optionally, the signal cable comprises a first signal cable and a second signal cable, the second signal cable is an outward extension cable of the first signal cable, and the second signal cable is connected to the first extension cable, to form the second overlapping region outside the first signal cable.

Optionally, the main cable of the common electrode cable comprises a first common stub, a second common stub, and a connection block. The first common stub is overlapped with the second gate electrode layer, and the connection block is a contact portion between the common electrode cable and the first gate electrode layer. The second common stub is connected to the connection block and the first common stub, and the second common stub is in parallel with a portion corresponding to the second gate electrode layer and is a slanting line. The first extension cable is connected to an intersecting point between the first common stub and the second common stub.

Optionally, the first extension cable comprises a convex cable, and the convex cable is located between the second common stub and the active switch and protrudes towards the active switch.

Optionally, the first extension cable comprises a vertical cable, one end of the vertical cable is connected to the convex cable, and the other end of the vertical cable is overlapped with the second signal cable. The convex cable and the vertical cable are not on one straight line, and the vertical cable and the first common stub maintain on a same straight line, which is not an extension cable of the convex cable. Therefore, a distance between the first signal cable and the vertical cable is greater than a distance between main bodies of the convex cable and the first signal cable.

Optionally, the main cable of the common electrode cable is in parallel with an edge corresponding to the second gate electrode layer.

Optionally, the signal cable comprises a third signal cable, the third signal cable is an outward extension cable of the first signal cable, and the third signal cable is connected to the second extension cable, to form the third overlapping region outside the first signal cable.

Optionally, the main cable of the common electrode cable comprises a second common stub, a third common stub, and a fourth common stub. The second common stub is a portion of the main cable close to the active switch, the fourth common stub is a portion at the bottom of the main cable, and the third common stub is connected to the second common stub and the fourth common stub and slants backward the third signal cable. The second extension cable is connected to the third common stub and the third signal cable.

Optionally, the display panel comprises a first cutting region, a second cutting region, a third cutting region, and a fourth cutting region, the first cutting region and the second cutting region are arranged on the signal cable at the two ends of the first overlapping region, the third cutting region and the fourth cutting region are arranged on the common electrode cable, and a cut signal cable and a common signal cable form a connected circuit.

Optionally, overlapped portions in the second overlapping region and the third overlapping region are connected through splicing.

Optionally, a cross-sectional area of each cutting region is greater than a diameter of a light dot during laser cutting.

Optionally, the main cable of the common electrode cable comprises a first common stub, a second common stub, and a connection block. The first common stub is overlapped with the second gate electrode layer, and the connection block is a contact portion between the common electrode cable and the first gate electrode layer. The second common stub is connected to the connection block and the first common stub, and the second common stub is in parallel with a portion corresponding to the second gate electrode layer and is a slanting line. The third cutting region is arranged on the second common stub.

Optionally, the main cable of the common electrode cable comprises a second common stub, a third common stub, and a fourth common stub. An orthographic projection of the second common stub overlaps with the active switch, the fourth common stub is a portion at the bottom of the main cable, the third common stub is connected to the second common stub and the fourth common stub, and the fourth cutting region is arranged on the fourth common stub.

Optionally, the fourth common stub protrudes backward the second gate electrode layer.

This application further discloses a display panel production method, comprising:

connecting a common electrode cable to a first gate electrode layer and a third gate electrode layer;

passing the common electrode cable through a second gate electrode layer;

connecting the second gate electrode layer to an active switch;

overlapping a signal cable with the active switch, wherein an overlapped portion is a first overlapping region; and connecting a first extension cable and a second extension cable to the signal cable at two ends of the first overlapping region, to form a second overlapping region and a third overlapping region.

This application further discloses a display apparatus. The display apparatus comprises the foregoing display panel and a drive circuit driving the display panel.

When a sub-pixel is displayed abnormally, for example, when three endpoints of a switch electrode are abnormally short-circuited, pixel electrode display is abnormal, or a common electrode is short-circuited, the signal cable at two ends of the overlapping region may be cut, and the first extension cable and the second extension cable of the common electrode cable are configured to overlap and be in contact with the signal cable, to continue to transfer a signal. In this way, information of the signal cable may be transferred to a pixel electrode in a next row.

BRIEF DESCRIPTION OF DRAWINGS

The accompanying drawings included are used for helping understand the embodiments of this application, constitute a part of this specification, illustrate examples of the embodiments of this application and, together with the description, serve to explain the principles of this application. Apparently, the following described accompanying drawings are merely some embodiments of this application. A person of ordinary skill in the art may further obtain other accompanying drawings according to these accompanying drawings without making creative efforts. In the accompanying drawings.

DETAILED DESCRIPTION

Specific structures and functional details disclosed herein are merely representative, and are intended to describe the objectives of the exemplary embodiments of this application. However, this application may be specifically implemented in many alternative forms, and should not be construed as being limited to the embodiments set forth herein.

In the description of this application, it should be understood that orientation or position relationships indicated by the terms such as "center", "transverse", "on", "below", "left" "right", "vertical", "horizontal", "top", "bottom", "inside", and "outside" are based on orientation or position relationships shown in the accompanying drawings, and are used only for ease and brevity of illustration and description, rather than indicating or implying that the mentioned apparatus or element must have a particular orientation or must be constructed and operated in a particular orientation. Therefore, such terms should not be construed as limiting of this application. In addition, the terms such as "first" and "second" are used only for the purpose of description, and should not be understood as indicating or implying the relative importance or implicitly specifying the number of the indicated technical features. Therefore, a feature defined by "first" or "second" can explicitly or implicitly include one or more of said features. In the description of this application, unless otherwise stated, "a plurality of" means two or more than two. In addition, the terms "include", "comprise" and any variant thereof are intended to cover non-exclusive inclusion.

In the description of this application, it should be noted that unless otherwise explicitly stated, terms such as "equipped", "connected", and "connection" should be understood broadly. For example, connection may be fixed connection, removable connection, or integrated connection; or may be mechanical connection or electrical connection; or may be direct connection, indirect connection implemented by using an intermediate medium, or internal connection between two elements. Persons of ordinary skill in the art may understand the specific meanings of the foregoing terms in this application according to specific situations.

The terminology used herein is for the purpose of describing specific embodiments only and is not intended to be limiting of exemplary embodiments. As used herein, the singular forms "a", "an" and "the" are intended to include the plural forms as well, unless the context clearly indicates otherwise. It should be further understood that the terms "include" and/or "comprise" when used in this specification, specify the presence of stated features, integers, steps, operations, elements, and/or components, but do not preclude the presence or addition of one or more other features, integers, steps, operations, elements, components, and/or combinations thereof.

This application is described below with reference to the accompanying drawings and embodiments.

Figure 1:
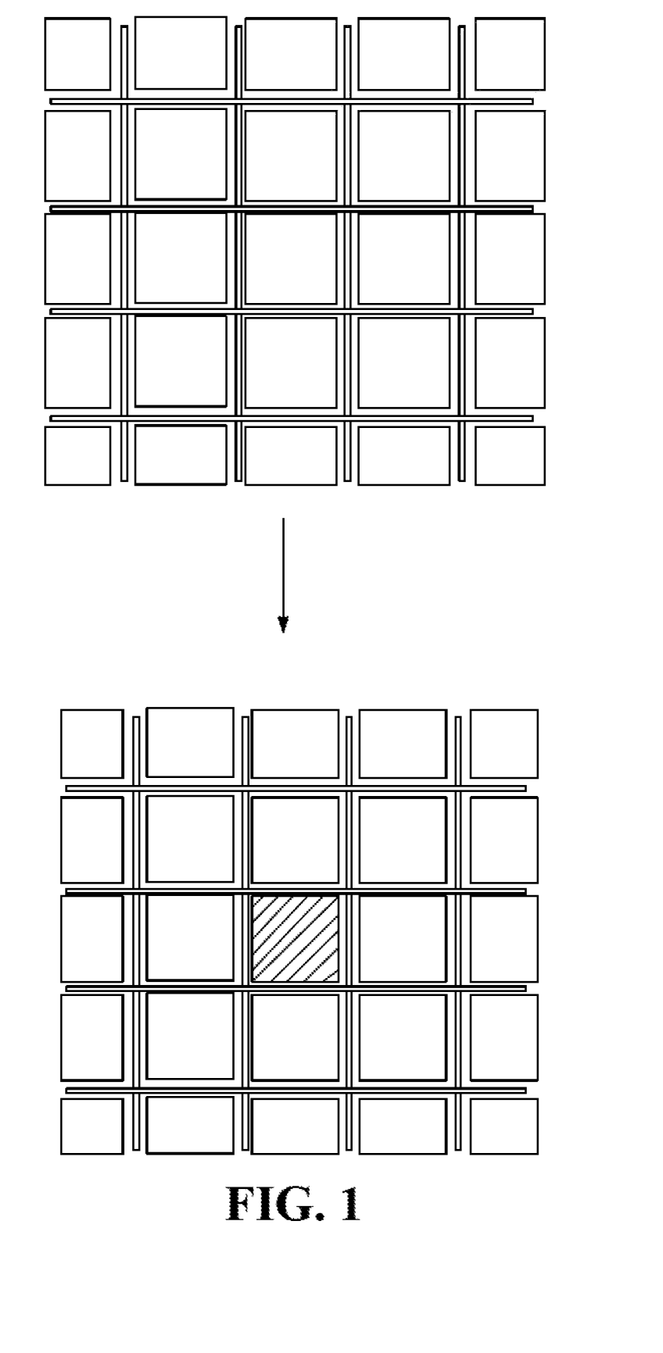
FIG. 1 is a schematic diagram showing that a bright dot of a known sub-pixel becomes a dark dot.
Figure 2:
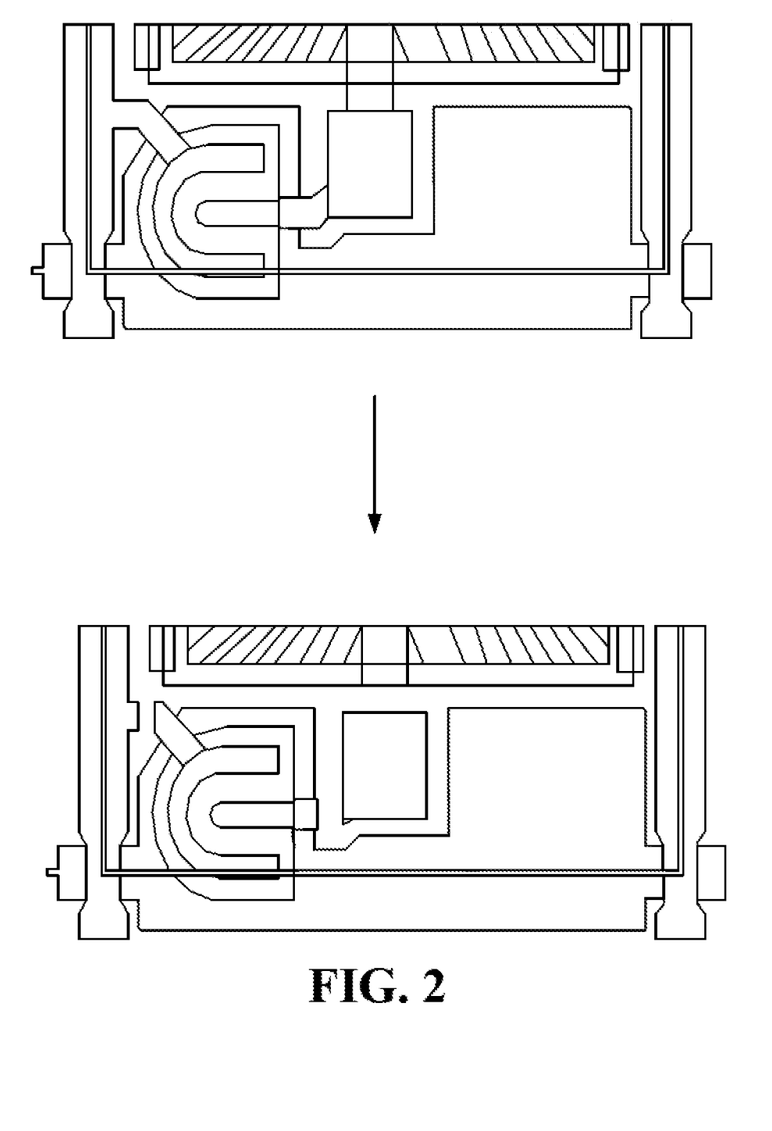
FIG. 2 is a schematic diagram of local mending of a known pixel.
Figure 3:
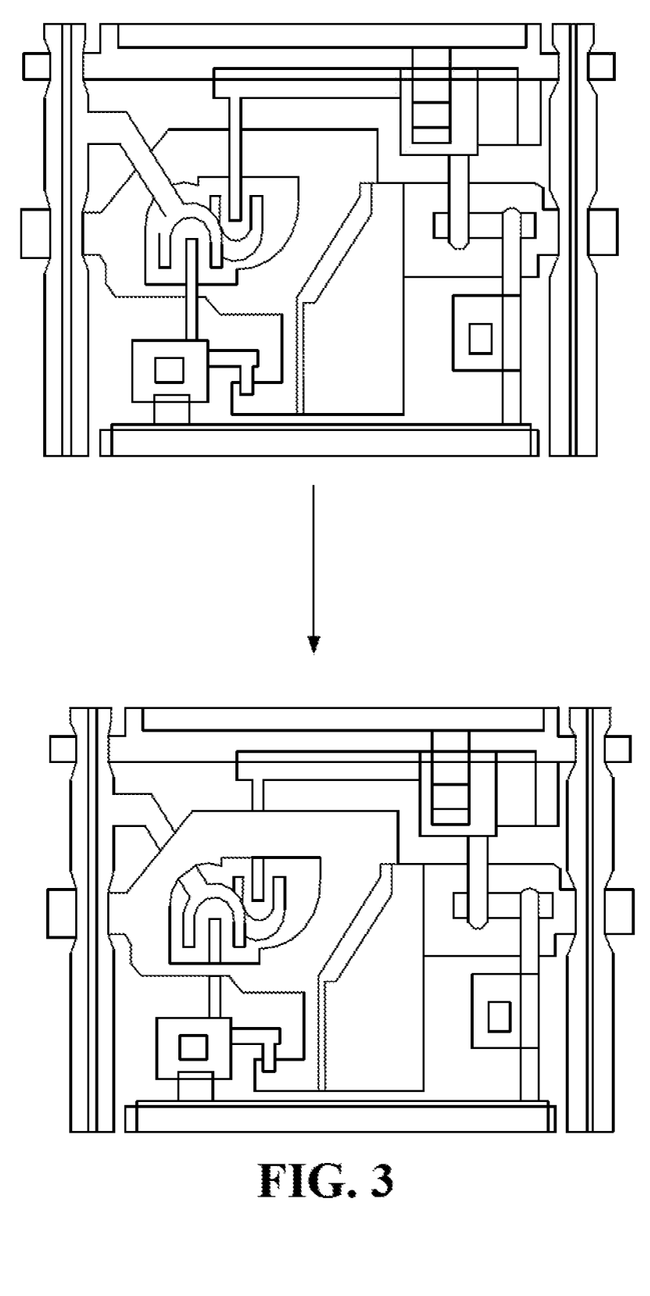
FIG. 3 is a schematic diagram of mending after a TFT increase of a known sub-pixel.

As shown in FIG. 1 to FIG. 3, in a panel production process, because of environment or machine device factors, some metal cables usually have defects or some metals are short-circuited, resulting in that a sub-pixel is displayed abnormally. For example, a gate metal cable and a data metal cable are abnormally short-circuited, resulting in a reduced product yield and cost waste. An improvement method known by the applicant is a laser cutting manner. A TFT endpoint of the sub-pixel displayed abnormally is cut, to separate the TFT endpoint from a short circuit, and make the sub-pixel form a dark dot. When a quantity of dark dots is sufficiently small, a product yield can be improved.

As shown in FIG. 1 and FIG. 2, some additional cables need to be designed in the active switch for laser cutting and mending, so that this mending method can be performed for the active switch. A light dot size and a cutting path required in laser cutting need to be considered in this design. Therefore, more design space is occupied.

As shown in FIG. 3, when design space is relatively small or a larger quantity of active switches need to be placed in limited space, the active switches may be designed to connect to a signal cable (data line). Although much design space can be reduced, a mending rate is reduced. How to increase mending possibility in this architecture is a main objective of this patent.

The design of this application is mainly applied to a pixel for which an active switch is combined with a signal cable. If the active switch is abnormal and needs to be mended after being produced, a drain of the abnormal active switch needs to be cut off.

Figure 4:
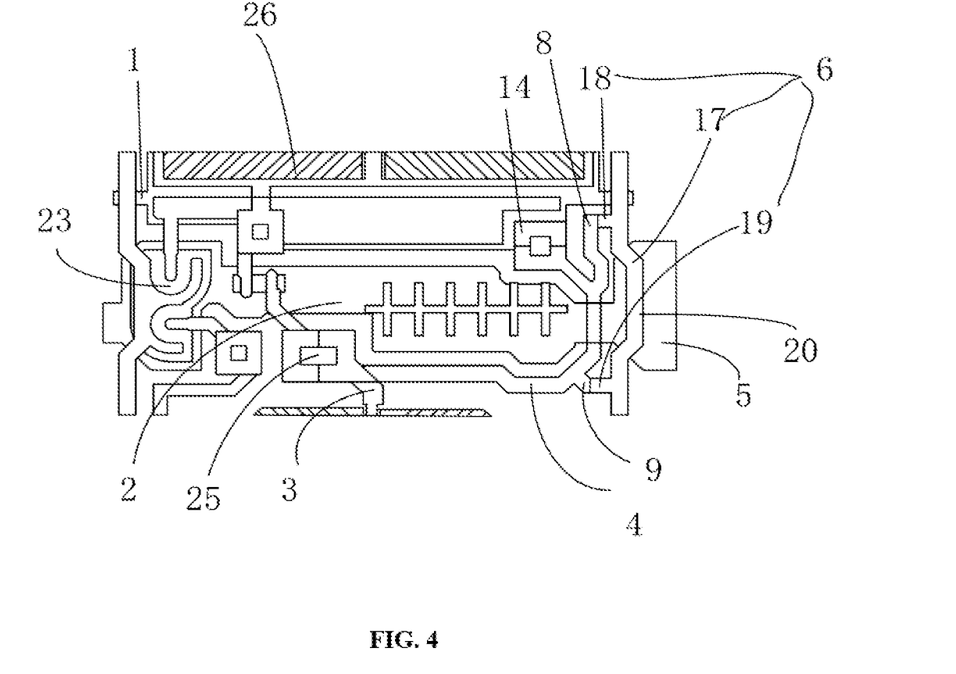
FIG. 4 is a schematic diagram of an active switch array according to an embodiment of this application.
Figure 5:
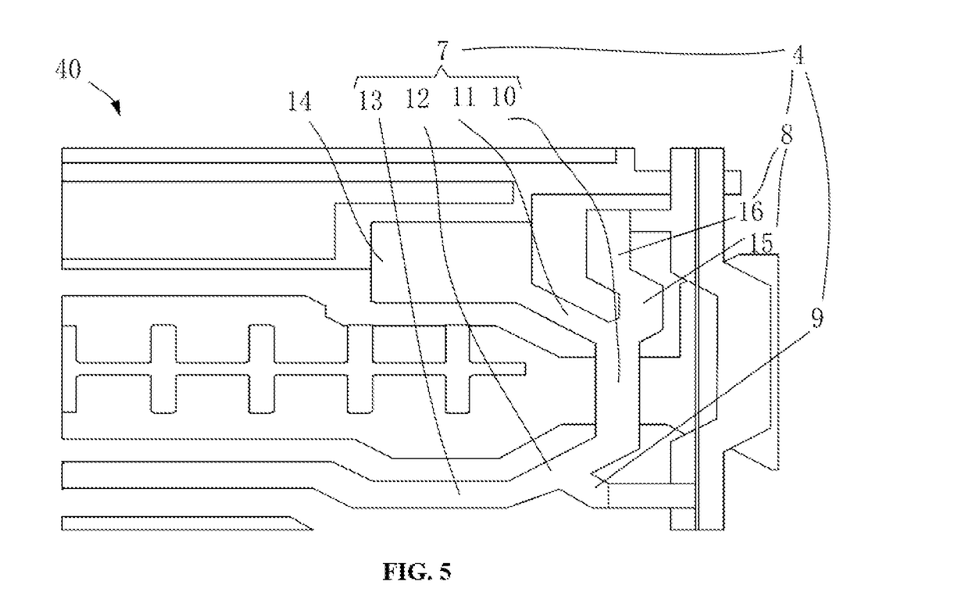
FIG. 5 is a local schematic diagram of an active switch array according to an embodiment of this application.
Figure 6:
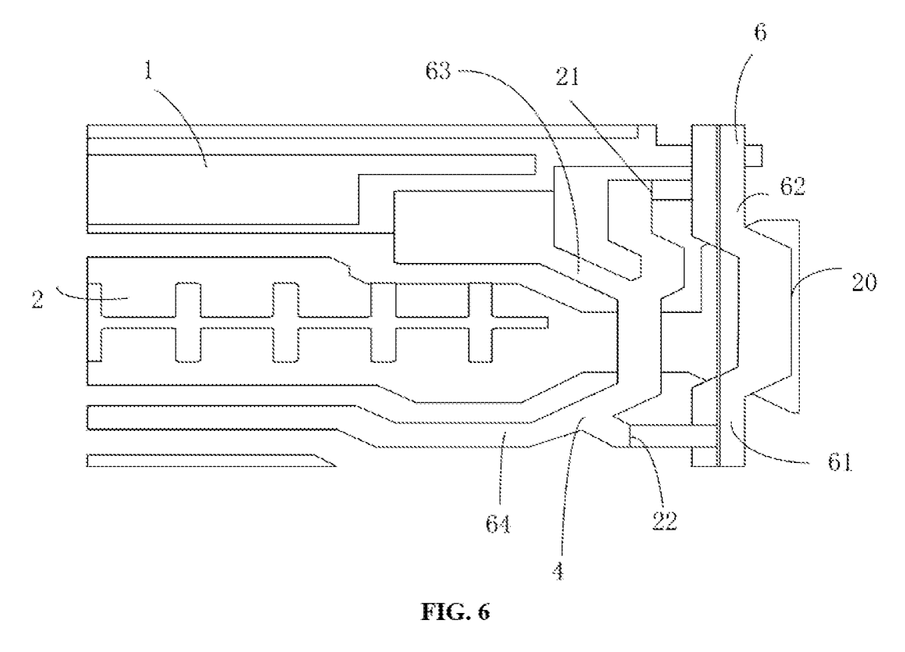
FIG. 6 is a schematic diagram of a mended active switch array according to an embodiment of this application.

Referring to FIG. 4 to FIG. 6, an embodiment of this application discloses a display panel 30. The display panel 30 includes a substrate 40. The substrate 40 includes a first gate electrode layer 1, a second gate electrode layer 2, a third gate electrode layer 3, a common electrode cable 4, an active switch 5, and a signal cable 6. The first gate electrode layer 1, the second gate electrode layer 2, and the third gate electrode layer 3 are sequentially arranged from top to bottom. The common electrode cable 4 is connected to the first gate electrode layer 1 and the third gate electrode layer 3 and passes through the second gate electrode layer 2, and the second gate electrode layer 2 is connected to the active switch.

The common electrode cable 4 includes a main cable 7, a first extension cable 8, and a second extension cable 9. The signal cable 6 is overlapped with the active switch 5, and an overlapped portion is a first overlapping region 20. The first extension cable 8 and the second extension cable 9 are connected to the signal cable 6 at two ends of the first overlapping region 20, to form a second overlapping region 21 and a third overlapping region 22.

The signal cable 6 includes a first signal cable 17 and a second signal cable 18, the second signal cable 18 is an outward extension cable of the first signal cable 17, and the second signal cable 18 is connected to the first extension cable 8, to form the second overlapping region 21 outside the first signal cable 17.

In this solution, the first extension cable 8 and the second signal cable 18 are not connected after overlapping, to avoid affecting a normal pixel electrode. However, when a pixel electrode is abnormal and needs to be mended, the first extension cable 8 and the second signal cable 18 in the second overlapping region 21 need to be spliced. If the first extension cable 8 is connected to the first signal cable 17, after the signal cable 6 is cut, because a cutting path is relatively small, a spliced portion and a cut portion of the signal cable 6 are easily connected. In this case, cutting needs to be performed for the second time, and consequently mending work becomes troublesome. Therefore, the second signal cable 18 extending outward is added to the first signal cable 17, and the second signal cable 18 and the first extension cable 8 form the second overlapping region 21 outside the first signal cable 17.

In an embodiment, the main cable 7 of the common electrode cable 4 includes a first common stub 10, a second common stub 11, and a connection block. The first common stub 10 is overlapped with the second gate electrode layer 2, and the connection block is a contact portion between the common electrode cable 4 and the first gate electrode layer 1.

The second common stub 11 is connected to the connection block and the first common stub 10. The second common stub 11 is in parallel with a portion corresponding to the second gate electrode layer 2 and is a slanting line. The first extension cable 8 is connected to an intersecting point between the first common stub 10 and the second common stub 11.

In this solution, when a sub-pixel is displayed abnormally and mending is required, the common electrode cable 4 needs to be disconnected from a pixel electrode, and a part of the common electrode cable 4 needs to be reserved for cutting. Therefore, the first extension cable 8 is connected to the intersecting point between the first common stub 10 and the second common stub 11, and the entire second common stub 11 can be used for cutting. Therefore, cutting space is relatively large, and an allowable error is relatively large.

In an embodiment, the first extension cable 8 includes a convex cable 15, and the convex cable 15 is located between the second common stub 11 and the active switch 5 and protrudes towards the active switch 5.

In this solution, the convex cable 15 is located between the second common stub 11 and the active switch 5 and protrudes towards the active switch 5. Therefore, there is relatively large space between the convex cable 15 and the second common stub 11. When pixel display is abnormal and the second common stub 11 needs to be cut, the convex cable 15 is not affected.

In an embodiment, the first extension cable 8 includes a vertical cable 16, one end of the vertical cable 16 is connected to the convex cable 15, and the other end of the vertical cable 16 is overlapped with the second signal cable 18. The convex cable 15 and the vertical cable 16 are not on one straight line, and the vertical cable 16 and the first common stub 10 maintain on a same straight line, which is not an extension cable of the convex cable 15. Therefore, a distance between the first signal cable 17 and the vertical cable 16 is greater than a distance between main bodies of the convex cable 15 and the first signal cable 17.

In this solution, if the vertical cable 16 and the convex cable 15 are on a same straight line, the distance between the vertical cable 16 and the first signal cable 17 is relatively small. When the first signal cable 17 is cut, the vertical cable 16 is affected because of the excessively small distance.

In an embodiment, the main cable 7 of the common electrode cable 4 is in parallel with an edge corresponding to the second gate electrode layer 2.

In this solution, after the main cable 7 of the common electrode cable 4 is in parallel with the edge corresponding to the second gate electrode layer 2, distances between the common electrode cable 4 and the edge corresponding to the second gate electrode layer 2 are all the same. This avoids that space is wasted because of an increased distance, and avoids that the main cable 7 of the common electrode cable 4 and the second gate electrode layer 2 affect each other in a working state because of an excessively small distance, resulting in undesirable consequences such as a short circuit.

In an embodiment, the signal cable 6 includes a third signal cable 19, the third signal cable 19 is an outward extension cable of the first signal cable 17, and the third signal cable 19 is connected to the second extension cable 9, to form the third overlapping region 22 outside the first signal cable 17.

In this solution, the second overlapping region 21 and the third overlapping region 22 are both on an outer side of the first signal cable 17. After the second overlapping region 21 and the third overlapping region 22 are spliced, entire mending work does not require repeated cutting, and a mending process is simple.

In an embodiment, the main cable 7 of the common electrode cable 4 includes a second common stub 11, a third common stub 12, and a fourth common stub 13. The second common stub 11 is a portion of the main cable 7 close to the active switch 5, the fourth common stub 13 is a portion at the bottom of the main cable 7, and the third common stub 12 is connected to the second common stub 11 and the fourth common stub 13 and slants backward the third signal cable 19. The second extension cable 9 is connected to the third common stub 12 and the third signal cable 19.

In this solution, the second extension cable 9 extends from the third common stub 12 slanting backward the third signal cable 19, and there is relatively large space between the second extension cable 9 and the first signal cable 17. When the first signal cable 17 is cut, the third common stub 12 is not affected. Ideally, it is convenient that the second extension cable 9 extends downward from below the second common stub 11. However, an interval between the second extension cable 9 and the first signal cable 17 becomes smaller, resulting in inconvenient mending.

In an embodiment, the display panel 30 includes a first cutting region 61, a second cutting region 62, a third cutting region 63, and a fourth cutting region 64, the first cutting region 61 and the second cutting region 62 are arranged on the signal cable 6 at the two ends of the first overlapping region 20, the third cutting region 63 and the fourth cutting region 64 are arranged on the common electrode cable 4, and a cut signal cable 6 and a common signal cable 4 form a connected circuit.

In an embodiment, overlapped portions in the second overlapping region 21 and the third overlapping region 22 are connected through splicing.

In this solution, a splicing manner ensures firmness and non-detachability.

In an embodiment, a cross-sectional area of each cutting region is greater than a diameter of a light dot during laser cutting.

In this solution, a cross-sectional area of each cutting region is greater than a diameter of a light dot during laser cutting, so that during laser cutting, another line is not affected.

In an embodiment, the main cable 7 of the common electrode cable 4 includes a first common stub 10, a second common stub 11, and a connection block 14.

The first common stub 10 is overlapped with the second gate electrode layer 2, and the connection block 14 is a contact portion between the common electrode cable 4 and the first gate electrode layer 1.

The second common stub 11 is connected to the connection block 14 and the first common stub 10, and the second common stub 11 is in parallel with a portion corresponding to the second gate electrode layer 2 and is a slanting line.

The third cutting region 63 is arranged on the second common stub 11.

In an embodiment, the main cable 7 of the common electrode cable 4 includes a second common stub 11, a third common stub 12, and a fourth common stub 13.

An orthographic projection of the second common stub 11 overlaps with the active switch 5, the fourth common stub 13 is a portion at the bottom of the main cable 7, the third common stub 12 is connected to the second common stub 11 and the fourth common stub 13, and the fourth cutting region 64 is arranged on the fourth common stub 13.

In an embodiment, the fourth common stub 13 protrudes backward the second gate electrode layer 2.

In this solution, the fourth common stub 13 protrudes outward, so that a sufficient margin is reserved to avoid affecting the second gate electrode layer 2 during laser cutting.

Figure 7:
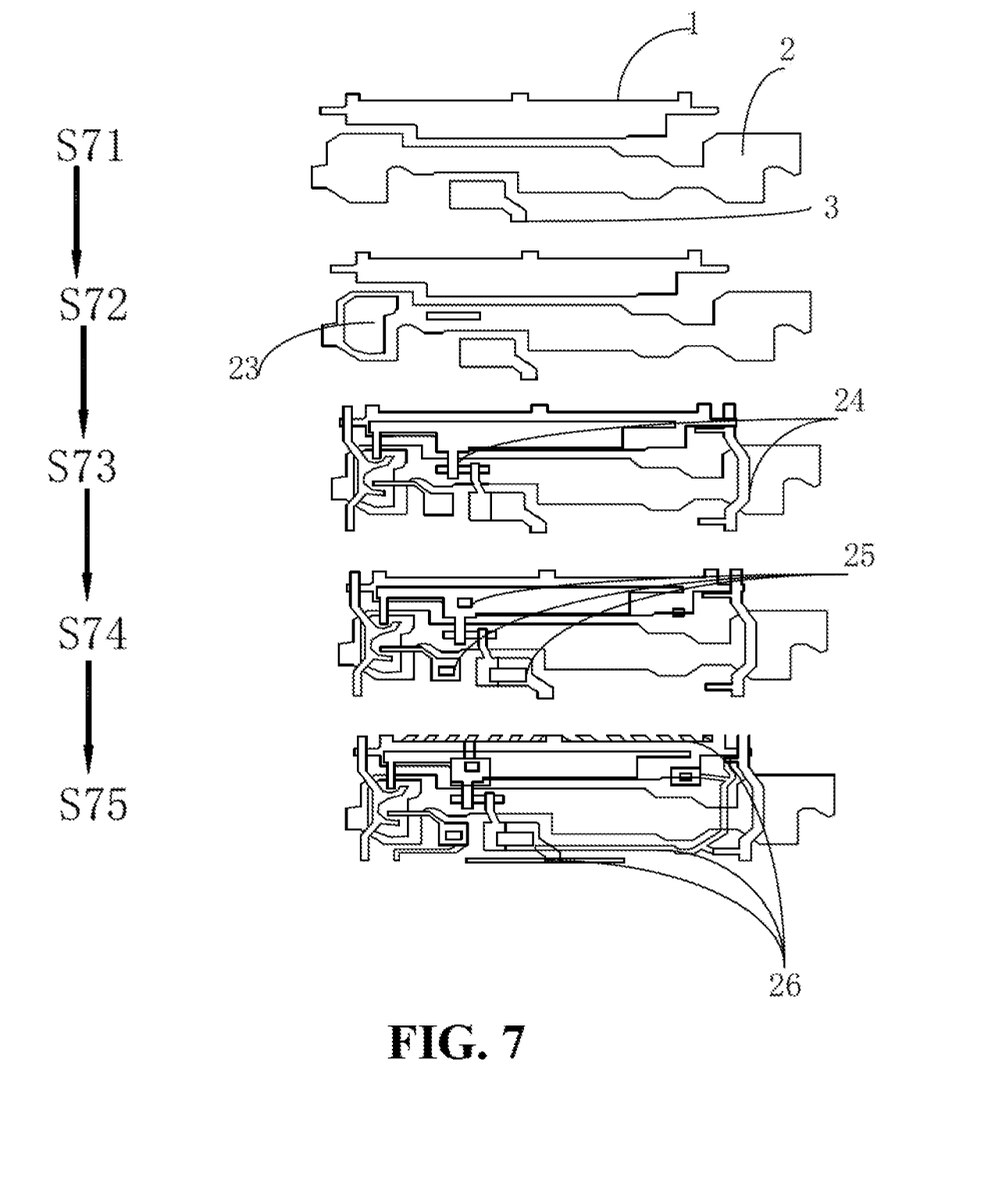
FIG. 7 is a schematic flowchart of producing a display panel according to an embodiment of this application.

An embodiment discloses a sequence of a manufacture procedure of the display panel 30. Referring to FIG. 7, the sequence of the manufacture procedure is as follows:

S71: Form gate electrode layers (corresponding to the first to the third gate electrode layers) on the substrate 40.

S72: Form a semiconducting layer 23 on the gate electrode layers.

S73: Form a source electrode layer and a drain electrode layer 24 of a thin film transistor on the semiconducting layer 23.

S74: Form a layer transform hole 25 on the drain electrode layer.

S75: Form a pixel electrode layer 26, and electrically connect to the drain electrode layer through the layer transform hole 25.

Optionally, referring to FIG. 5, an embodiment discloses a mending method for the foregoing display panel. As shown in FIG. 6, the mending method includes:
- cutting the first cutting region 61 and the second cutting region 62 on the signal cable at two ends of the second overlapping region 21;
- cutting the third cutting region 63 and the fourth cutting region 64 on the main cable 7;
- forming a connected line with the signal cable 6 and the common electrode cable 4 remained after cutting; and
- connecting the extension cable and the signal cable 6 through splicing, where
- the cutting manner is a laser cutting manner.

Figure 8:
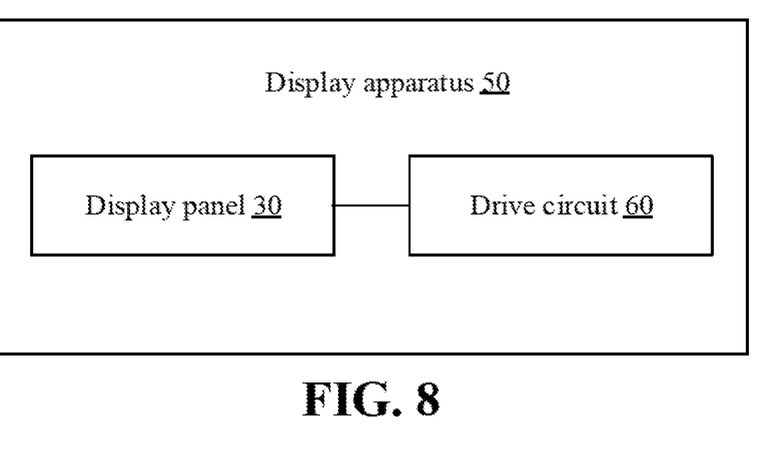
FIG. 8 is a schematic diagram of a display apparatus according to an embodiment of this application.

This application further discloses a display apparatus 50. As shown in FIG. 8, the display apparatus 50 includes the foregoing display panel 30 and a drive circuit 60 driving the display panel 30.

The display panel in this application may be a twisted nematic (TN) panel, an in-plane switching (IPS) panel, and a multi-domain vertical alignment (VA) panel, and may be a panel of another type certainly, provided that the display panel is applicable.

The foregoing contents are detailed descriptions of this application with reference to specific implementations, and it should not be considered that the specific implementation of this application is limited to these descriptions. A person of ordinary skill in the art of this application can further make simple deductions or replacements without departing from the concept of this application, and such deductions or replacements should all be considered as belonging to this application.

What is claimed is:

1. A display panel, wherein the display panel comprises a substrate, and the substrate comprises:
   a first gate electrode layer, a second gate electrode layer, and a third gate electrode layer, wherein the first gate electrode layer, the second gate electrode layer, and the third gate electrode layer are sequentially arranged from top to bottom;
   a common electrode cable, wherein the common electrode cable is connected to the first gate electrode layer and the third gate electrode layer and passes through the second gate electrode layer;
   an active switch, connected to the second gate electrode layer; and
   a signal cable, overlapped with the active switch, wherein an overlapped portion is a first overlapping region, wherein
   the common electrode cable comprises a main cable, a first extension cable, and a second extension cable, and the first extension cable and the second extension cable are connected to the signal cable at two ends of the first overlapping region, to form a second overlapping region and a third overlapping region;
   wherein the display panel comprises a first cutting region, a second cutting region, a third cutting region, and a fourth cutting region, the first cutting region and the second cutting region are arranged on the signal cable at the two ends of the first overlapping region, the third cutting region and the fourth cutting region are arranged on the common electrode cable, and a cut signal cable and a common electrode cable form a connected circuit;
   wherein the main cable of the common electrode cable comprises a first common stub, a second common stub, and a connection block;
   the first common stub is overlapped with the second gate electrode layer, and the connection block is a contact portion between the common electrode cable and the first gate electrode layer;
   the second common stub is connected to the connection block and the first common stub, and the second common stub is in parallel with a portion corresponding to the second gate electrode layer and is a slanting line; and
   the third cutting region is arranged on the second common stub.

2. The display panel according to claim 1, wherein overlapped portions in the second overlapping region and the third overlapping region are connected through splicing.

3. The display panel according to claim 1, wherein a cross-sectional area of each cutting region is greater than a diameter of a light dot during laser cutting.

4. The display panel according to claim 1, wherein the main cable of the common electrode cable comprises the second common stub, a third common stub, and a fourth common stub; and an orthographic projection of the second common stub overlaps with the active switch, the fourth common stub is a portion at the bottom of the main cable, the third common stub is connected to the second common stub and the fourth common stub, and the fourth cutting region is arranged on the fourth common stub.

5. The display panel according to claim 4, wherein the fourth common stub protrudes backward the second gate electrode layer.

* * * * *